INVENTOR
HENDRIK F. BOK
BY Semmes & Semmes
ATTORNEYS

Oct. 28, 1969   H. F. BOK   3,475,202
METHOD FOR CONTROLLING A SPRAY-COATING ENVIRONMENT
Filed Oct. 19, 1967   5 Sheets-Sheet 5

INVENTOR
HENDRIK F. BOK
BY Semmes & Semmes
ATTORNEYS

United States Patent Office 3,475,202
Patented Oct. 28, 1969

3,475,202
METHOD FOR CONTROLLING A SPRAY-COATING ENVIRONMENT
Hendrik F. Bok, % Epec Industries, Inc., Industrial Park, New Bedford, Mass. 02745
Filed Oct. 19, 1967, Ser. No. 676,599
Int. Cl. B05c 11/16; B44d 1/08
U.S. Cl. 117—102                           4 Claims

ABSTRACT OF THE DISCLOSURE

Method of controlling a spray-coating environment so as to eliminate the effects of "overspray" and "bounce back" of spray dust, occasioned during spraying of articles to be coated. Articles to be coated are passed through the environment along a path. A filtered stream of air is passed through the environment in a direction transverse to the path of the articles under such conditions as to provide laminar flow. Solvent is flowed over all internal surfaces environment and a liquid solvent baffle is provided across the flowing air stream at the exit to the environment whereby airborne solid residue is precipitated from the air and recovered.

BACKGROUND OF THE INVENTION

Field of the invention

Spray-coating of photo resist on printed circuit boards, chemical milling, semi-conductor and micro-circuit wafers and the like is accomplished by traversing a spray-coating gun within a filtered laminar-flow air environment. The object of the laminar-flow of filtered air is to assure that the spray-coating is conducted within an environment which is limited to impure particle sizes of .3 micron or less. Laminar-flow of filtered air, thus, has been the principal medium for controlling the spray-coating environment. However, the desired objective is virtually unachievable, according to conventional spray-coating processes. For the "overspray," occasioned by the continuous spraying between the circuit board increments and the "bounce back" of spray dust, occasioned by the striking of the spray upon the circuit board and bouncing back into the laminar-flow of air results in an atmosphere literally charged with dried particles of spray. The flow of laminar air from one end to the other end of the environment does not guarantee a continuous removal of this "overspray" and "bounce back." Particularly, at the exit filter a certain amount of eddying of air currents is inevitable with the result that spray dust is kicked back into the spraying area.

Consequently, so called controlled spray-coating environments, while attempting to eliminate the "overspray" and "bounce back" problem, in fact create a whole set of new problems. The dust settling on the objects to be coated results in the impossibility of providing a uniform coating of the character desired. In photo-resist applications, this "overspray" and "bounce back" not only wrecks the articles being coated but is wasteful of photo resist which sells for $40.00 to $60.00 per gallon.

SUMMARY OF THE INVENTION

According to the present method, the spray-coating environment is not controlled solely by the laminar-flow of filtered air. Rather, "overspray" and "bounce back" are absorbed by horizontally flowing a solvent liquid, through the bottom of the environment and vertically flowing solvent as a baffle transversely of flowing of said filtered air and at one end of said environment. This flowing solvent, being compatible with photo resist or the other medium being sprayed, literally precipitates and dissolves the dry spray dust. The term "solvent" is used to designate any liquid which is compatible with the paint being sprayed to the extent that "overspray" and "bounce back" particles may be dissolved therein. For example in the spraying of a water-base paint, water may be flowed, as the solvent liquid.

By recirculating the solvent medium with dissolved spray dust, a spray-coating medium is developed which recovers virtually all of the spray dust and may be ultimately used as the spraying medium. Vertical flowing of the solvent is accomplished over a plurality of vertically upstanding, staggered channels through which the solvent is a gravity feed and behind which there is positioned an exhaust fan so as to draw the laminar-flow of filtered air through the baffle, enhancing the absorption of spray dust within the vertically flowing solvent. Spray dust which is not urged against the end baffle falls by gravity into a bottom pan of horizontally flowing solvent where it is recirculated with the solvent recovered at the end baffle.

Modifications of invention include the employment of an air knife covering entry and exit portals at either side of the environment and circulating of solvent over the upper surfaces of the environment chamber.

Controlling the spray-coating environment according to this method results in maintaining Class 100 clean room conditions in the spray-coating environment.

DESCRIPTION OF THE PREFERRED EMBODIMENTS

Figure 1:
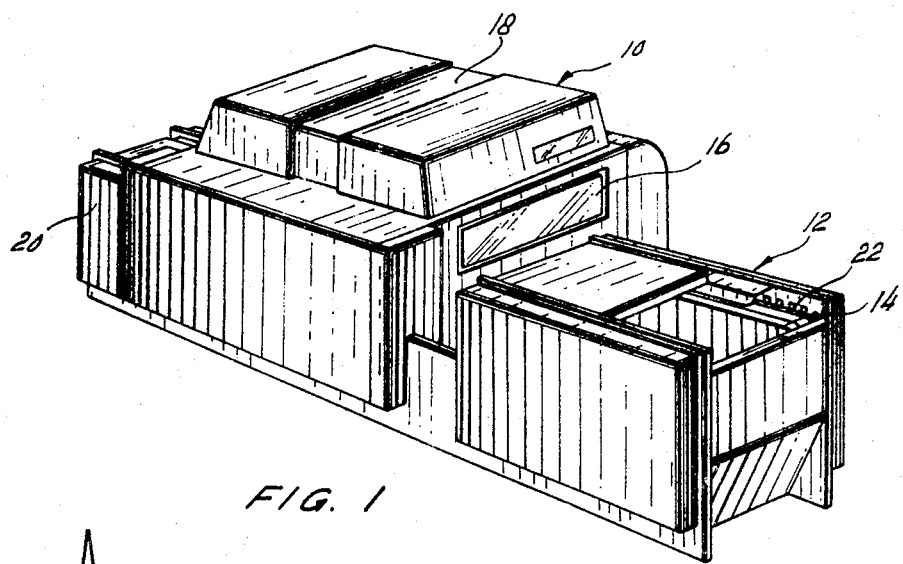
FIG. 1 is a perspective view of a spray-coating module 10 and its feeding conveyor station 12.

In FIG. 1 a spray module, generally designated as 10 is illustrated as positioned adjacent a delivery station 12 having endless conveyor chain 22 defining a delivery area 14. The transverse spray-coating area 18 is illustrated by the unidirectional arrow and discharge area 20 is indicated adjacent thereto. Window 16 enables the operator to observe the spray-coating.

Figure 2:
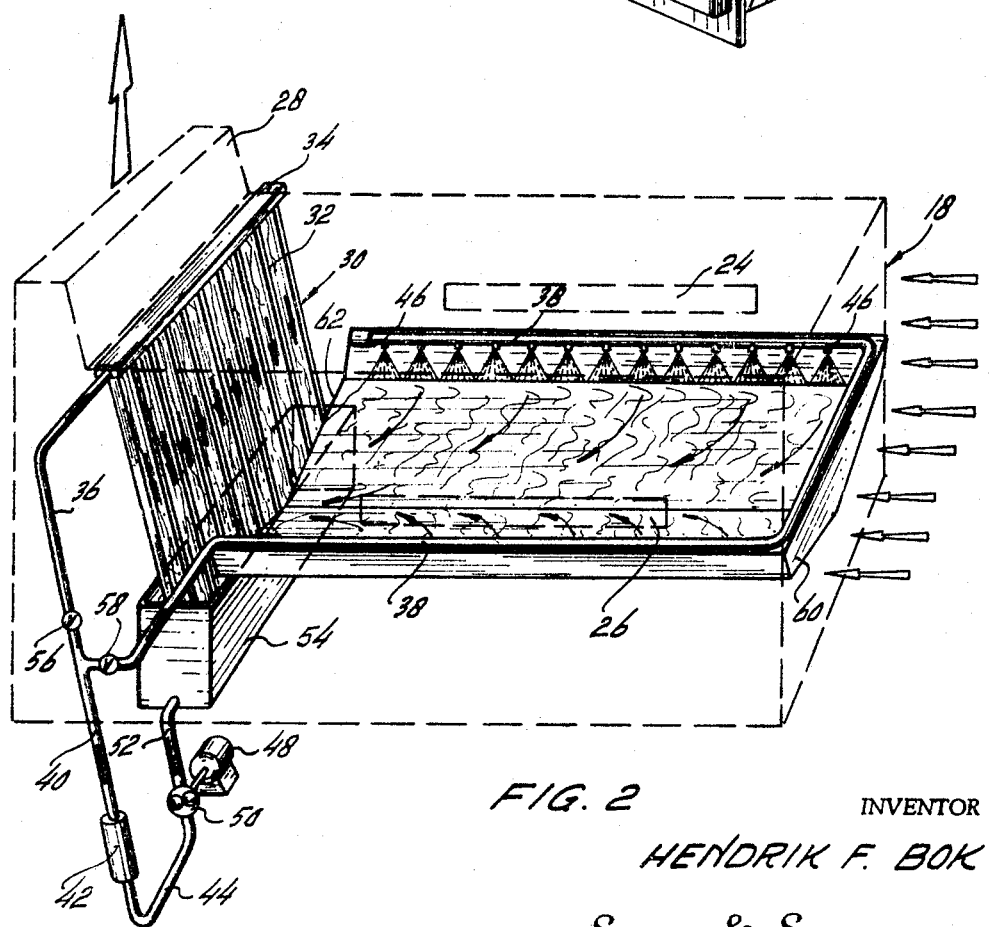
FIG. 2 is a schematic view of the spraying environment (defined in phantom) and showing the systems for horizontal flowing of solvent through the bottom of the environment and vertical flowing of solvent at one end of the environment as a liquid baffle.
Figures 9, 11:
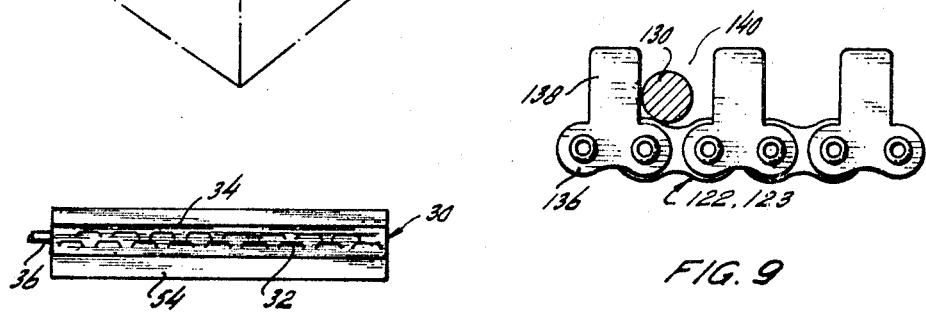
FIG. 9 is an enlarged side elevation showing a series of conveyor chain links defining rod-engaging areas 140.
FIG. 11 is a vertical section of the end baffle 30, showing the individual, staggered channels 32.

In FIG. 2 the spray-coating environment 18 is outlined with dotted lines and illustrated as having entry portal 26 and exit portal 24 through which a conveyor mechanism carries articles to be spray-coated. An exhaust hood 28 is positioned at one end of the spray-coating environment posterially of solvent-wetted end wall baffle 30 comprised of individual, vertically upstanding, overlapped or staggered baffles 32, also illustrated in top plan in FIG. 11. Solvent liquid is introduced through hood 34 for vertical flowing as an end baffle transversely of flowing of filtered air. A complementary horizontal flowing solvent pan 60 is positioned beneath the spray-coating environment and has a series of peripheral nozzles 46 connected to feeding conduit 38. The vertical flowing solvent dropping by gravity through wetted wall baffle 30 is collected in pan 54 which receives, also, the horizontal flowing solvent falling as a waterfall at 62 from pan 60. This solvent is recirculated via conduit 52, motor 48, driving gear pump 50, conduit 44, fine, small micron size filter 42, conduit 40 and individual horizontal feeding conduit 38, controlled by needle valve 58, and vertical feeding conduit 36, controlled by needle valve 56.

By varying filtering of the solvent at 42, the size of the precipitates may be precisely controlled so that the recirculated solvent can be developed as a spraying medium. The solvent may be of any type which is compatible with the spray-coating medium and is not readily evaporable. Solvents, employed with photo resists are aromatic types such as xylene and hi-flash naphtha, ketones, esters and chlorinated solvents. Tri-chlorobenzene and similar slow evaporating chlorinated solvents with boiling point over 200° F. can be effectively used where reclaiming of the photo resist is not essential such as in the semi-conductor and micro-circuit industry. By inserting a probe (not illustrated) the changing viscosity of the solvent and resin may be determined. As the viscosity approaches the desired viscosity of the spray-coating medium, the circulated solvent may be withdrawn for spray-coating purposes. Particular photo resist formulations used today range from 7% to 30% solids by volume. By employing both a fast and slow evaporating solvent with these solids, for example 80% fast solvent and 20% slow solvent, an exceptionally uniform coating can be achieved.

Figure 3:
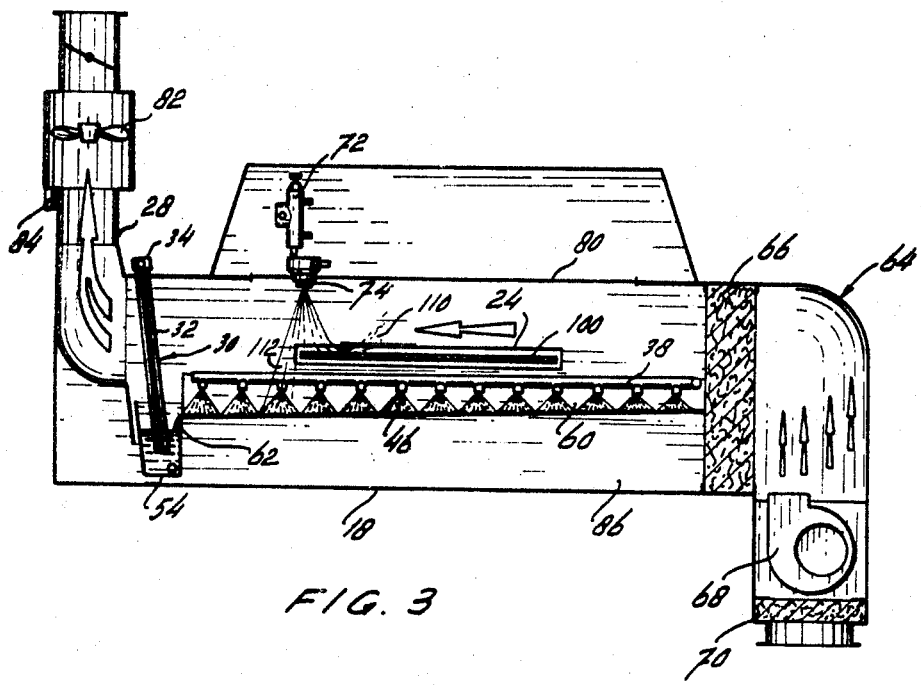
FIG. 3 is a side elevation of the spray-coating environment illustrated in FIG. 2, and showing the system for circulating of the solvent medium with respect to the laminar-flow of filtered air.

In FIG. 3 the bottom pan 60 and end baffle 30 arrangements are shown with respect to conventional spray gun 72, having nozzle 74 which is reciprocated transversely of the conveyance line through top portal 80. In blower-filter unit 64 laminar-flow air is developed by squirrel cage or similar blower 68 prefiltered at 70 and final filtered with a .3 micron filter 66 to supply a quantity of filtered air sufficient to develop 120–180 linear feet per minute of laminar air movement through the spray-coating environment. A positive overpressure in the spray-coating environment may be developed by regulating exhaust fan 82 to draw air at a slightly lower speed.

It will be noted in FIGURE 3 that the air inlet and filter 66 are equal in cross-sectional area to the transverse cross-sectional area of the chamber forming the spraying environment thus there is no abrupt expansion or change of direction of the air after it leaves the filter to introduce turbulence. This aids in the development and maintenance of laminar flow conditions throughout the spraying environment.

Figure 4:
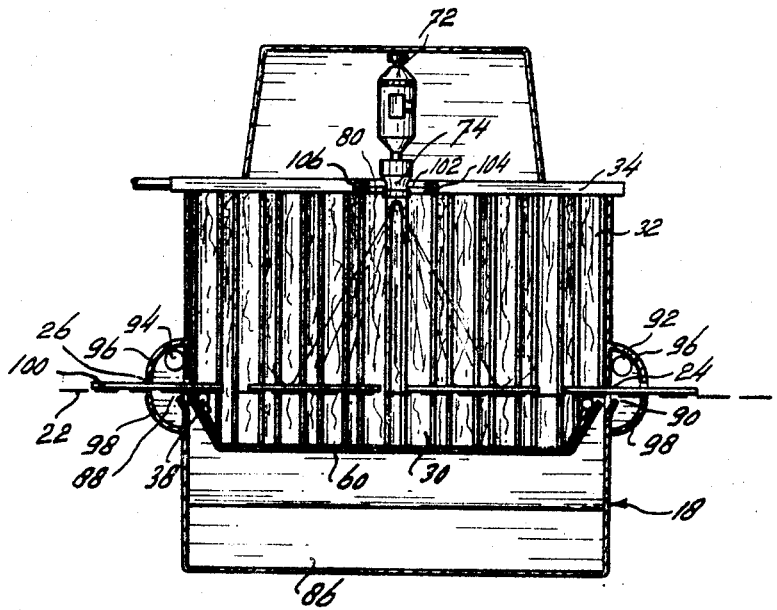
FIG. 4 is a transverse section of the spray-coating environment, illustrated in FIG. 3, and showing the bottom pan and end baffle flowing medium superposed with respect to the air knife employed at the entry and exit portals of the environment.

In FIG. 4 there is illustrated the positioning of bottom pan 60 and end baffle 30 with respect to an air knife pressurizing chamber 86, for which the filtered air is developed through filter 6. Filtered air is forced from chamber 86 as air knife blade seals 88 and 90 across entry portal 26 and exit portal 24 both being substantially shielded by upper hood 96 and lower hood 98. Air knife seals 88 and 90 may be directed and recovered by a slotted suction tubes 94 and 92, suction being developed through the conduit 84 shown fragmentarily in FIG. 3, as communicating with exit fan 82.

Figure 5:
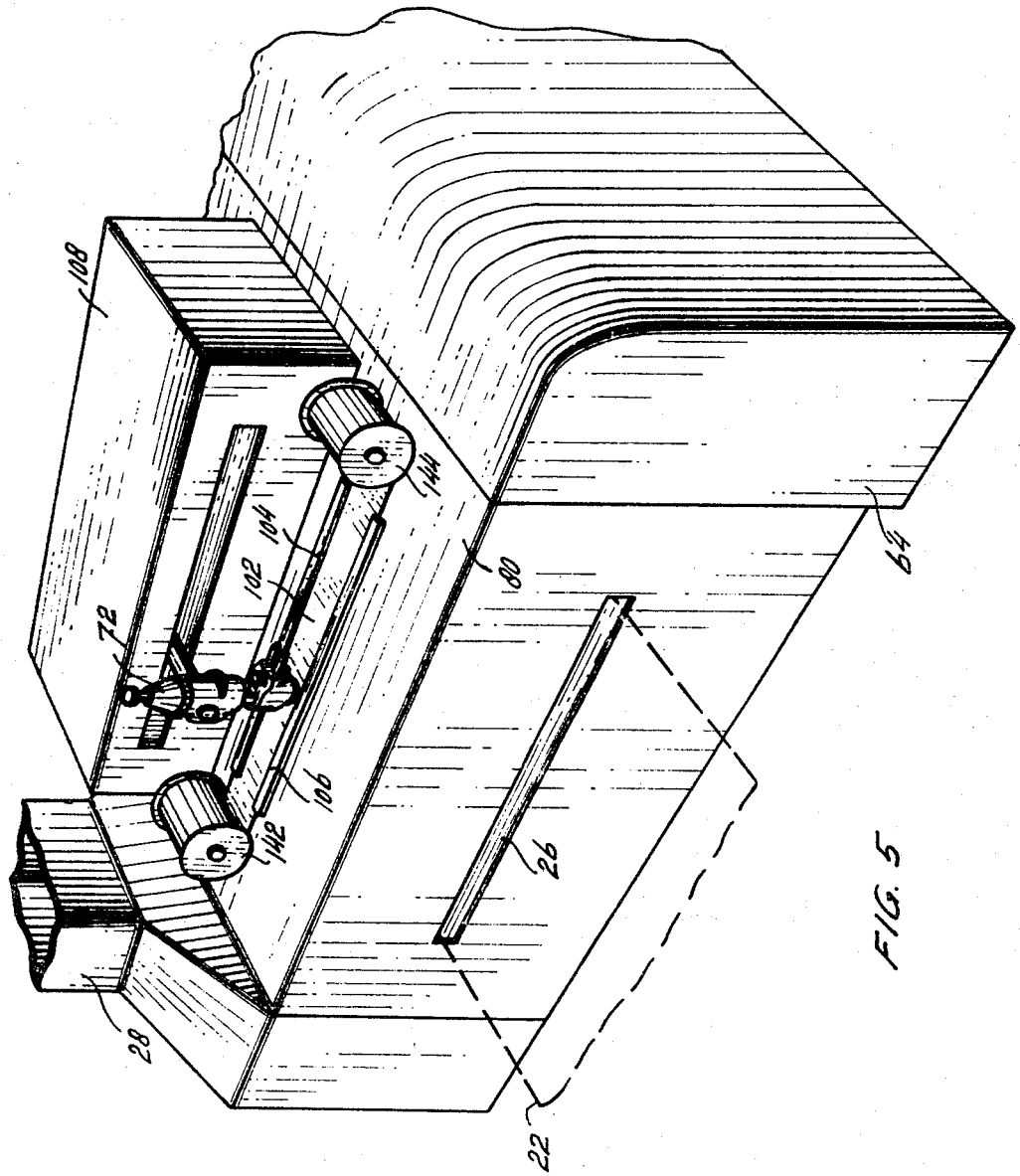
FIG. 5 is a fragmentary perspective showing a medium for sealing a spray-coating gun throughout its traversing distance.

The automatic spray gun 72, as well as traversing mechanism 108, as illustrated in FIGS. 4 and 5, may be positioned medially of a self-coiling thin stainless steel spring 102 secured at either end to rollers 142 and 144 and guided over top portal 80 on either side by Teflon or like tracks 104 and 106. Thus, as the automatic gun reciprocates transversely across the top portal 80, a positive seal is provided so as to avoid disturbing the laminar-flow of filtered air within the spray-coating environment.

Figure 6:
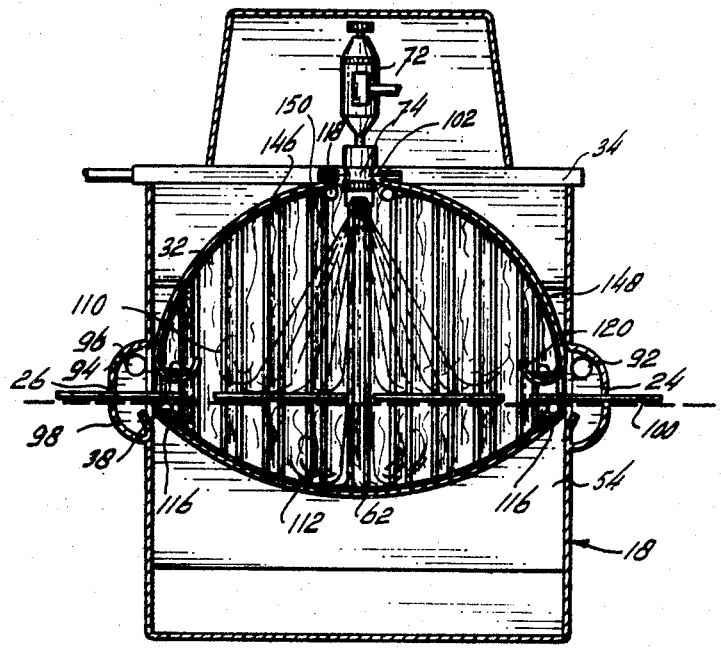
FIG. 6 is a transverse section, similar to that shown in FIG. 4, yet illustrating a modification of invention wherein the solvent liquid is sprayed substantially circumferentially of the laminar-flow, as well as perpendicularly thereto.

A modification of the invention is illustrated in FIG. 6 wherein flowing of laminar air is substantially circumferentially enclosed by flowing solvent. According to this modification, a bottom pan 114 fed by nozzles 116, assures a horizontal flowing of solvent concurrently with vertical downward flow of solvent at the end of the zone. Top pans 146 and 148 include conduit 118 having nozzles 150 directing solvent flowing onto the upper walls of the chamber or environment. This vertically downward flowing solvent is collected above the conveyor line by lower flanges 120, which may incline toward end baffle 32, permitting collected solvent to fall concurrently with waterfall 62 for collection in pan 54. Bounce-back 110 and overspray 112 of spray-coating material settle against wet surfaces of top pans 146 and 148 and wet surface bottom pan 114.

Applicant's method is essential for maintaining clean room spray-coatings in micro-circuitry, semi-conductor, chemical milling and basic thin film etchings wherein the line spacing and width tolerances are expressed in microns, as opposed to the conventional .001 inch tolerances in more conventional art work for the printed ciricuits and chemical milling.

Figure 7:
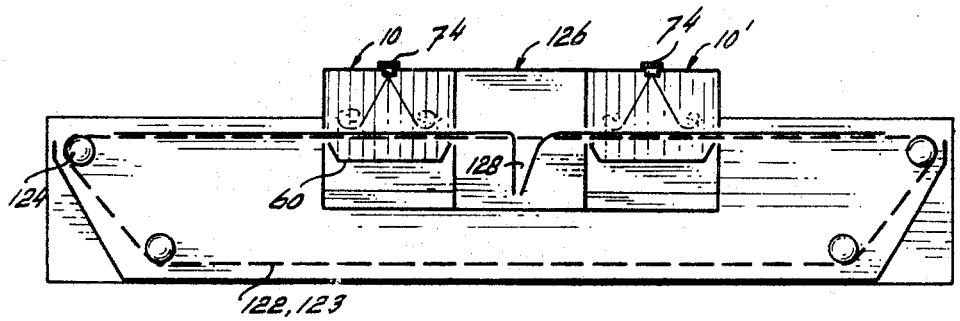
FIG. 7 is a schematic view, showing a continuous line system wherein identical spray-coating environments 10 and 10' are positioned on an endless conveyance with an intervening reversing mechanism 126, so that both sides of an advancing panel board or other substrates may be coated without stopping of the system.

In FIG. 7 identical spraying environments 10 and 10' are illustrated as positioned over endless conveyors 122 and 123 rotating about sprockets 124 and including an intermediate reversing area 126, having cul-de-sac tracks 128.

Figure 8:
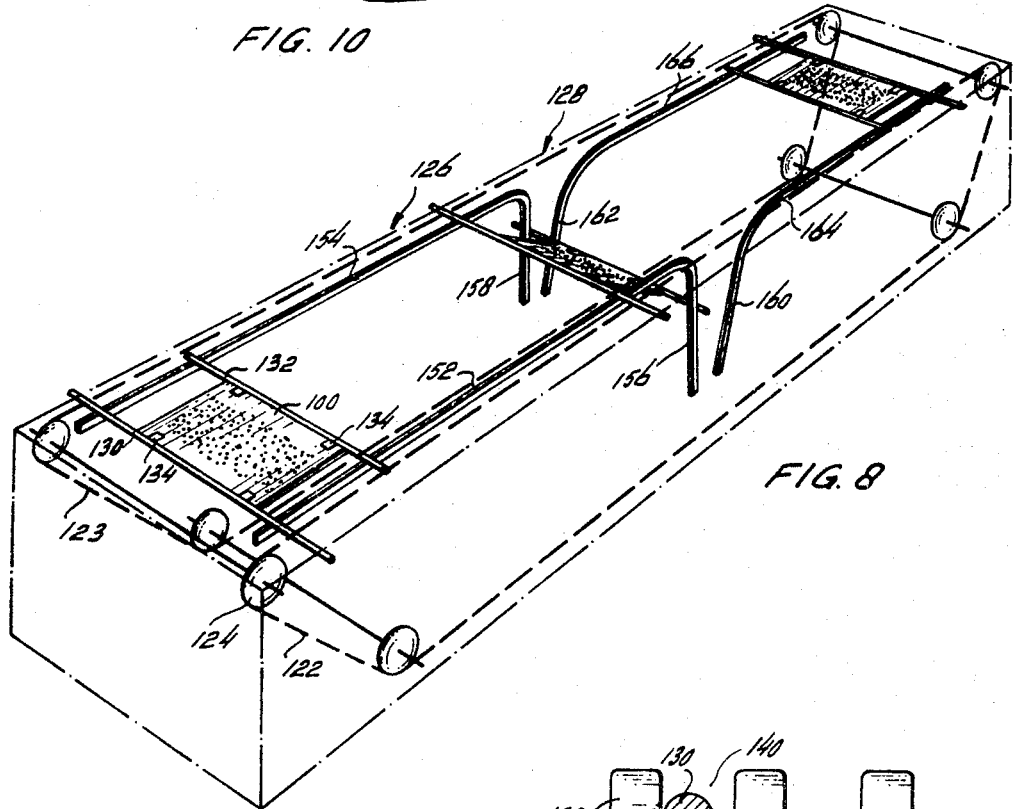
FIG. 8 is a schematic view showing a track mechanism for reversing the face of the panel to be sprayed, according to FIG. 7.

This system is further illustrated schematically in FIG. 8 as comprising individual conveyor chains 122 and 123 of the type comprising individual links 136 having upstanding portions 138 which define an open space 140 for grasping long rod 130 secured to printed circuit board 100 by conventional clips 134. A short rod 132, similarly secured to the leading edge of the circuit board 100 rests upon guide tracks 152, 154, 164, and 166.

Figure 10:
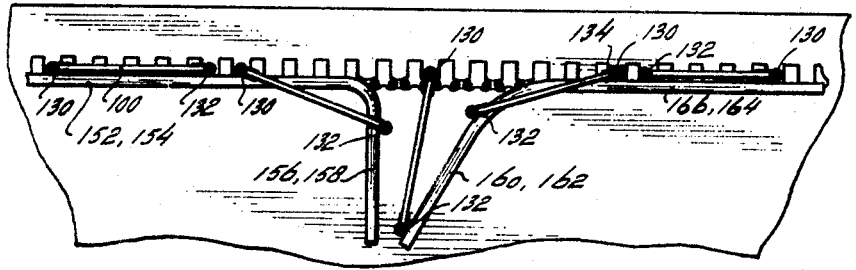
FIG. 10 is an enlarged fragmentary schematic view showing a cul-de-sac for reversing the panel sides, while the advancing chain continues.

As illustrated in FIG. 10, short rods 132 drop into cul-de-sac 128, defined by track ends 156, 158, 160 and 162, while the chains 122 and 123 continue to advance long rod 130. This results in long rod 130 being presented at the leading edge of board 100 and short rod 132 being presented at the trailing edge, thus reversing the printed circuit board intermediate stations 10 and 10' and enabling spray-coating of both sides in a continuous line system.

I claim:
1. Method for controlling a spray-coating environment including:
   (A) flowing filtered air, longitudinally through said environment, in such a manner as to develop and maintain laminar-flow conditions throughout said environment;
   (B) horizontally flowing a solvent liquid through the bottom of said environment, so as to precipitate and dissolve overspray;
   (C) simultaneously vertically flowing said solvent liquid as plurality of staggered downwardly flowing streams into said horizontally flowing liquid, said downwardly flowing streams defining a baffle transversely of said flowing filtered air and at an end of said environment; and
   (D) recovering and recirculating said horizontally flowing and vertically flowing solvent.

2. Method of controlling a spray-coating environment as in claim 1 wherein said flowing of filtered air is enhanced by application of vacuum downstream of said plurality of staggered downwardly flowing streams of solvent.

3. Method of controlling spray-coating environment as in claim 2 including dissolving said overspray in said solvent within said environment and, recirculating said solvent for use as a spray-coating medium.

4. Method of controlling a photo resist spray-coating environment as in claim 1, said vertically flowing of solvent as a baffle being gravity fed through a plurality of vertically upstanding overlapping, staggered channels.

References Cited
UNITED STATES PATENTS

| | | |
|---|---|---|
| 2,155,932 | 4/1939 | Davis 118—328 |
| 2,217,345 | 10/1940 | McGraw. |
| 2,259,626 | 10/1941 | Erickson. |
| 2,848,353 | 8/1958 | Norris. |
| 2,981,525 | 4/1961 | Umbricht. |

ALFRED L. LEAVITT, Primary Examiner

J. H. NEWSOME, Assistant Examiner

U.S. Cl. X.R.

117—34, 104; 118—326